United States Patent Office 3,345,936
Patented Oct. 10, 1967

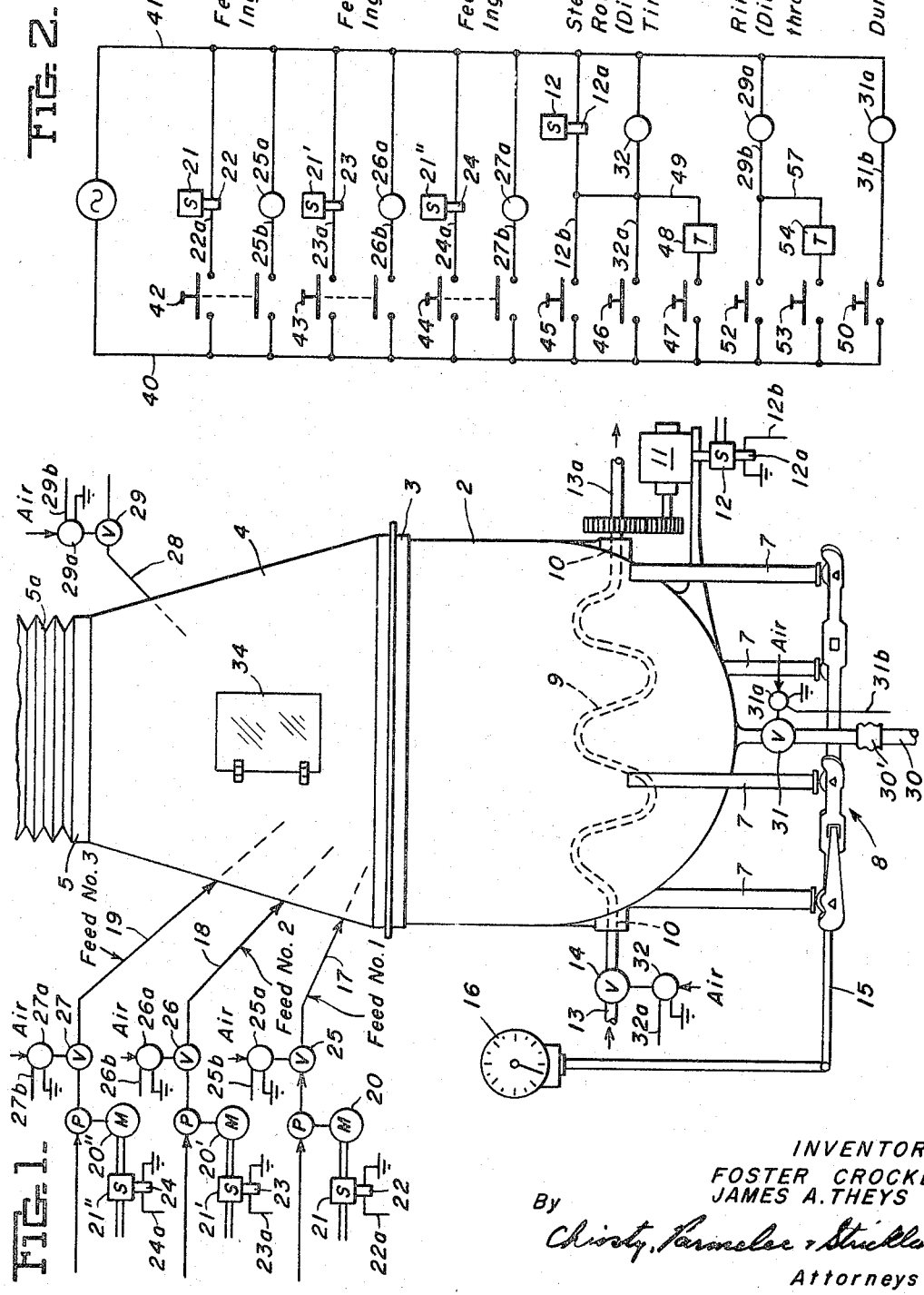

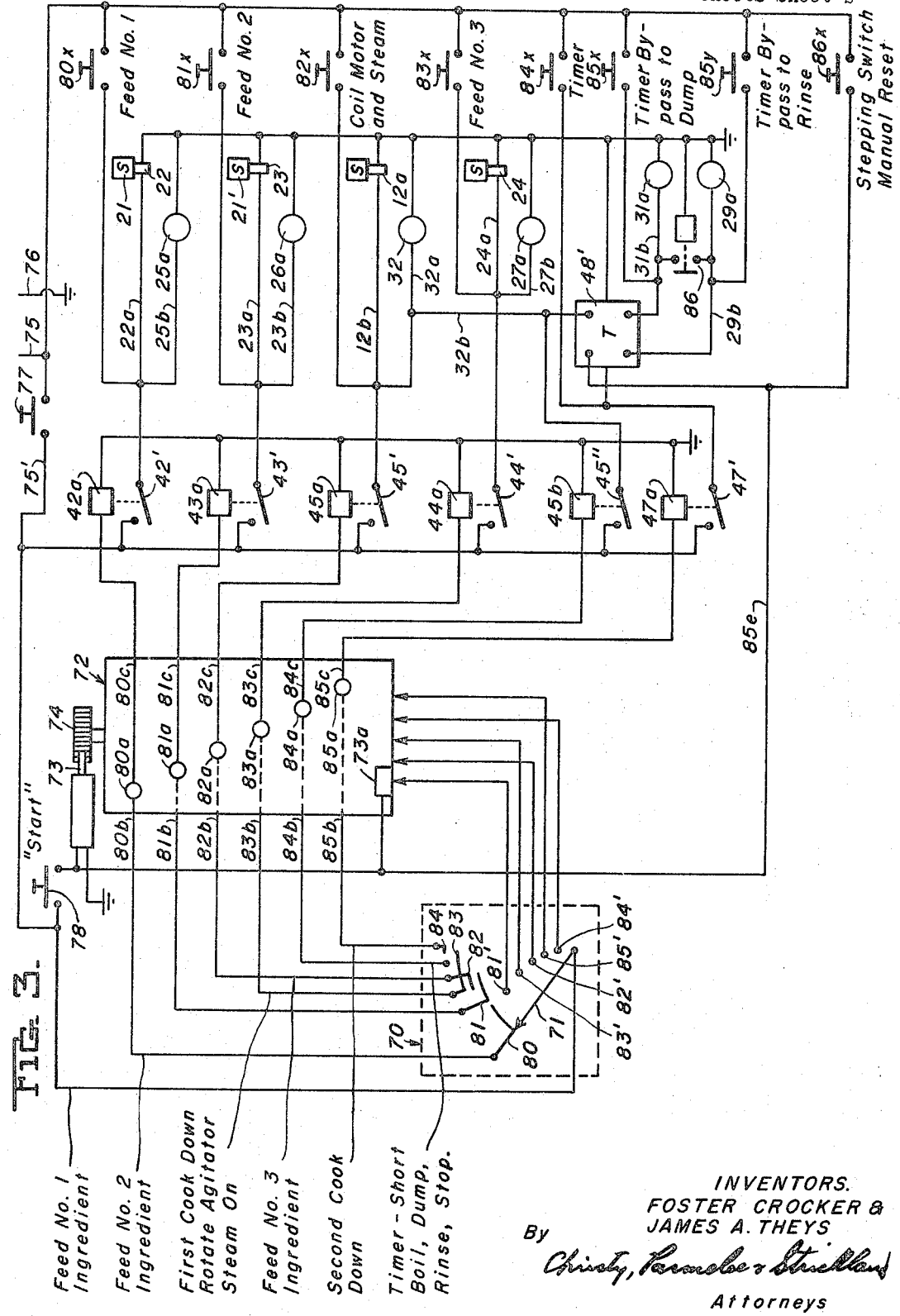

3,345,936
BATCH COOKING PROCESS
Foster Crocker, Glenshaw, and James A. Theys, Osborne, Pa., assignors to H. J. Heinz Company, Pittsburgh, Pa., a corporation of Pennsylvania
Filed Oct. 21, 1963, Ser. No. 317,660
8 Claims. (Cl. 99—334)

This invention relates to the commercial preparation of cooked food products wherein it is important that each batch meet within almost exact tolerance the requirements of a recipe so that the ultimate purchasers can be assured of a uniform quality time after time, and is for a method and apparatus which will assure the uniformity of successive batches and require less exacting attention on the part of the operator.

The invention is especially applicable to the preparation of those products where at least some different ingredients are introduced into a kettle at different times, one being added only after a previous material has been cooked to predetermined consistency. It is, however, not so limited.

Cooking in a kettle involves the evaporation of water and a common practice is to observe the decrease in the level of the substance being cooked and thereby afford the cook some indication as to the progress of the cooking. The cook usually supplements his skilled observation by measuring the level in the kettle with a gauge stick which he dips into the kettle, and in this way determines the depth. This requires that the cooking and agitation be stopped or the rate reduced to a point where foaming and turbulence is negligible each time the depth is measured. This test must be repeated until the correct level is measured on the gauge stick, and the skill and attentiveness of the cook are important.

Since the evaporation which takes place during cooking effects a reduction in the weight of the material in the kettle, the present invention employs a kettle which is supported on weighing apparatus that continuously indicates the weight and responds to the reduction of weight as the cooking continues. If a specified measured weight of material is initially introduced into the kettle as each batch is started, cooking can continue without interruption until a predetermined loss of weight is indicated. If another ingredient is then to be added, an exact weight of the second ingredient can be charged into the kettle and cooking continued until the next critical weight point is reached. Possibly as the product nears completion, seasoning may be introduced and cooking resumed only sufficiently to blend the seasoning into the product with no appreciable change of weight due to evaporation. In such case a preset length of time may be substituted for change of weight at this stage. It is contemplated therefore that change of weight in certain stages may determine when succeeding steps are to take place and lapse of time determine others. At the end of the cooking, the kettle is dumped, drained, rinsed, and a new batch started.

While the succession of steps may be carried out manually, the present invention permits fully or partially automated operation through electrical sequencing circuit means responsive to such change of weight and usually such time lapse schedule as may be established for the preparation of any specific product.

It is an object of the present invention to provide a new and improved process and apparatus for batch cooking of food products.

Another object is to provide an apparatus for batch cooking by which the ingredients in a cook tank are continuously weighed with the change of weight governing the sequential feeding and cooking of the ingredients.

A further object is to provide a method for the automatic evaporative cooking of a food product such that precision control is maintained of the process steps throughout the various phases of the operation including the charging of material into the kettle, the subsequent cooking, and finally the discharging of the finished cooked product from the kettle.

A complete understanding of the invention may be had from the following detailed description of specific embodiments thereof when read in conjunction with the accompanying drawings, wherein:

FIG. 1 is a schematic view of an apparatus for batch cooking in accordance with this invention;

FIG. 2 is a schematic circuit diagram for the remote manual operation of the apparatus shown in FIG. 1; and FIG. 3 is a schematic diagram of another embodiment of the invention for automatic control of a batch cooking process.

Referring now to the drawings, wherein like reference characters designated like or corresponding parts throughout the several views, there is shown in FIG. 1 a vessel 2 which serves both as a weigh tank and a kettle. On the upper edge of the vessel is a vapor hood 4 that has a stack section 5 at the top which is connected with a stack through an extensible connection 5a.

The vessel or kettle is here shown with a plurality of supporting legs 7 at spaced positions thereabout, these legs in turn being supported on a system of interlocking scale beam levers schematically indicated at 8, these scale beams being of a type known in the weighing scale industry and forming no part of the present invention. They are so ararnged as to be sensitive to a change of weight, but to cancel out or neutralize vibration due to the boiling of the large mass of material in the kettle or the rotation of the stirrer to be hereafter described. Motion of the scale beams is transmitted through linkage 15 to an indicator 16.

As here shown, the contents of the vessel are heated and at the same time agitated by a horizontally-extending steam coil 9 rotatable about its axis, the coil having shaft portions 10 at each end that pass through sealed glands in the side wall of the vessel. There is shown a motor 11 supported on the vessel 2 and geared to the coil for rotating it. It has a switch 12 and an electromagnetic switch operator 12a controlled through a circuit including wire 12b. High pressure steam is supplied to the coil from pipe 13 through valve 14.

One ingredient to be charged into the kettle may be introduced through conduit 17, and another ingredient may be supplied through conduit 18, these conduits leading from supply sources, such as hoppers or reservoirs, not shown. Still a third ingredient may be supplied through conduit 19 and if desired, others may be provided. There is a pump P in each line 17, 18 and 19, each being driven by a motor 20, 20' and 20'' respectively. These motors each have a switch designated respectively 21, 21' and 21''. Each switch has an electromagnetic switch operator, these being designated 22, 23 and 24, respectively. Line 22a controls current to switch operator 22; line 23a the switch operator 23, and line 24a the switch operator 24. In addition to a pump in the supply line for each ingredient there is a valve in each line or conduit. Valve 25 is in conduit 17. It is coupled to a valve operator 25a that is operted by air pressure and the air supply to the operator 25a is controlled electrically. The air-actuated valve-operating devices are well known, as are the electromagnetic valves in the air supply lines. The electrically operated valve in the air supply to the valve actuator is energized through wire 25b. This valve operator is electrically controlled from a wire 25b leading to a switch as will hereinafter more fully appear. In like manner there is a valve 26 in conduit 18, with an air operator 26a, and 26b is in the control circuit therefor, and there is a valve 27 with a similar operator 27a with wire 27b in its control circuit.

Rinse water for flushing out the vessel 2 after each batch has been emptied is supplied through pipe line 28 in which is a valve 29, but if desired it may be a simple solenoid-operated valve not using air, since it may be a relatively light valve. For illustration valve 29 is here shown to be similar to valves 25, 26 and 27.

There is a drain pipe 30 at the bottom of the vessel. In this pipe is a dump valve 31. It is actuated by an air operator 31a connected to its valve stem, as in the valves above described, with an electromagnetic control for its air supply, the control including wire 31b. In the actual embodiment of the invention all valves 25, 26, 27 and 31 should be close to the vessel so as to avoid over-run in the case of the ingredient supply conduits and collection of product or rinse water in the drain pipe 30.

The admission of steam to the agitating and heating coil as explained above is controlled through valve 14. This valve, like the others, has an actuating device 32 operated by air pressure connected with its valve stem, and the air flow to device 32 is electrically controlled, a control circuit wire connected thereto being designated 32a.

The motor 11 is supported on the vessel 2 so as to move up and down therewith as the weight of the contents in the vessel changes, and drain pipe 30 should include a flexible coupling, indicated at 30' so as not to interfere with the vertical movement of the vessel. Steam pipe 13 and all other feed pipes or conduits opening into the vessel or its hood must include some flexible tubing and swiveled joint (not shown). Pipe 13a at the other end of the coil for removing condensate and spent steam must have some similar flexible connection. All wiring to parts that move with the kettle must be flexible. As before pointed out, the stack 5 is fixed and the top of the hood 4 moves freely tin a vertical direction relative to it. In the cooking of some products, it may be desirable to manually add a small portion of some ingredient for which no mechanical feed is provided, this ingredient being simply dumped into the kettle from a measuring cup by hand. The hood therefore has an acces door 34 that may be opened to permit this operation.

In FIG. 2 there is shown a simplified circuit for the manual control of the feeding of ingredients to the vessel 11, the cooking of the ingredients within the vessel, the discharging of the cooked ingredients from the tank, and th rinsing of the tank. In this figure 40 and 41 are power lines leading from any suitable source of current. The operation is initiated by closing switch 42 which energizes wire 22a for operating the starting switch 21 for the motor 20 to feed the first ingredient. At the same time a circuit is made to line 25b to effect the opening of the valve 25 by operation of its air-powered actuator 25a.

When the weight of the ingredients supplied through the conduit 17, as indicated on the scale 16, FIG. 1, has reached the value desired, the switch 42 is opened and valve 25 closes and motor 20 stops. The next ingredient is then fed to the tank 11 by closing of a switch 43 to complete a circuit to wire 23a to energize switch operator 23 to operate switch 21' to operate pump motor 20' and at the same time close a circuit through wire 26b to effect actuation of 26a to open valve 26 in feed conduit 18 for charging a second ingredient into the vessel 2. The combined weight of the ingredients is then observed on the scale 16, and the switch 43 is opened when the total desired weight is reached. If it is then desired to begin cooking before the next ingredient is added, a switch 45 is closed to connect the switch operator 12a through wire 12b to the power supply to drive the motor 11 for the rotation of the coil 9. The switch 45 may be closed to rotate the coil 12 after the first two ingredients have been fed to the tank 11, or it may be closed during the feeding of the first two ingredients to better mix them prior to cooking, or as desired, a third ingredient may be added through conduit 19 by closing switch 44 to energize wire 24a for starting pump motor 20'', and at the same time complete a circuit through wire 27b to operate valve operator 27a to open valve 27 in conduit 19.

At the same time the agitator motor switch 45 is closed or immediately before or after, switch 46 is closed so as to connect wire 32a with the power source to thereby activate valve actuator 32 to open steam valve 14. In the use of switches 45 and 46 the operator will usually leave them closed until the desired loss of weight due to evaporation of water or other volatiles has brought the scale indicator 16 back to a predetermined position when these switches may be opened for the adding of a third ingredient, or for some other reason, such as the manual addition of a small amount of an ingredient, as above explained. At some time in the operation it may be desirable, as where a measure of spice is added to a batch of food that is about finished, to merely cook for a predetermined short time interval rather than for any length of time that would result in a loss of weight by evaporation. For this purpose switch 47 is shunted around switches 45 and 46 and a timer is indicated at 48, so that the agitator may be rotated with the steam turned on for a predetermined period of time, just a few minutes perhaps, and then automatically shut off. Switch 47 connects wire 40 through the timer and wire 49 with wire 12b and 32a.

When cooking has been completed switch 50 is operated to connect line 31b into circuit, actuating valve operator 31a to effect opening of the dump valve 31. When the scale reading drops to zero the kettle will be about empty. For flushing the tank with rinse water there is a switch 52 through which current may be supplied to wire 29b to effect the opening of the rinse valve 29. There may be a shunt circuit including switch 53 with a timer 54 and wire 57 so that the rinse valve may be directly operated or operated through a timer.

In FIG. 3 there is a rudimentary diagram illustrating how the cooking apparatus of FIG. 1 may be automatically or manually controlled. The view is diagrammatic and in actual practice many refinements may be incorporated in the circuit and signal lights and audible signals may be included but have not been shown, and for purposes of clarification only simple elements are illustrated, and many ancillary functions omitted, such as provision in the instrumentation for checking automatically before each succeeding step to make sure that operations are kept within specified tolerance, and shut down operations when weight is above or below tolerance.

The cooking apparatus is the same as that described in FIG. 1. The scale indicator has associated therewith a switch 70 with an arm 71 that is moved with the sweep hand of the scale along various contacts adjusted to appropriate positions in the path of travel of the arm 71. A rotating drum stepping switch is indicated generally at 72, but with contacts here shown as though the drum were projected as a flat surface. This drum is rotated step by step through an electromagnetic pawl 73 engaging a ratchet 74 at one end of the drum. Each electric impulse to the pawl 73 advances the drum one step. Power supply lines are indicated at 75 and 76, and a switch at 77 enables automatic operation to be terminated at any time by opening line 75' which connects the power supply line 75 with the switch arm 71. There is a "start" switch 78 for starting each cycle manually, if desired, at the conclusion of the preceding cycle.

When a cycle of cooking is started there is no material in the cooking vessel 11; the switch arm 71 is in the "zero" position, engaging contact 80. When the starting switch 78 is closed momentarily, an impulse is sent through the electromagnetic pawl to rotate the drum one step from the "off" position to establish a circuit from 80 to the first stepping switch contact 80a through wire 80b, and from this contact through wire 80c to a relay coil 42a for operating switch 42' corresponding to switch 42 in FIG. 2 to thereby effect operation of motor switch operator 22, and at the same time actuate the operating device 25a for valve 25 in feed conduit 17. The advance of the drum also connects an impulse contact 81′ of the switch 70 to an impulse-transmitting segment 73a on the drum 72. As the scale hand moves along contact 80 due to the increase in weight in the kettle, it strikes impulse contact 81′ to send an impulse to the electromagnetic pawl to rotate the drum one step. At the same time the switch arm 71 is then engaged with a contact 81. The rotation of the drum through one step breaks the circuit to the first ingredient feeding system, stopping the feed of the first ingredient, and it closes contact with the coil 43a of relay switch 43′, corresponding to switch 43 of FIG. 2 to start charging of the second ingredient into the kettle, as previously described, actuating the switch operator 23 for motor 21′ through wire 23a and valve operator 26a for valve 26 through wires 23a and 23b respectively. This is through a circuit leading from contact 81, stepping switch contact 81a, wire 81b to wire 81c. This movement of the drum also moves the impulse segment 73a on the drum to the next position where it is in circuit with impulse contact 82′.

As the second ingredient is charged into the cooking vessel the switch arm 71 moves along contact 81 until it reaches impulse contact 82′, whereupon an impulse is sent to the electromagnetic pawl 73 to advance the drum and establish a circuit from contact 82 to stepping switch contact 82a through wire 82b to wire 82c. This movement of the drum breaks the circuit in line 81c to effect the stopping of the second ingredient to the cooking tank and the energization of the wire 82c to energize the coil 45a of a relay switch 45′ corresponding to 45 of FIG. 2 and starts the agitator motor 11 via its switch operator 12a. It also opens the steam valve 14 by energizing valve operator 32 through line 32a to admit steam to the revolving agitator. This advance of the stepping switch moves impulse contact 73a to its third position where impulse contact 83′ is connected with the magnetic pawl 73. The first cook-down of the ingredients then take place, and due to evaporation from the cooking vessel the switch arm 71 moves back along contact 82 until it closes a circuit with impulse contact 83′ to advance the stepping switch one more step. This breaks the circuit to wire 82c and shuts off the flow of steam to the agitator and stops the agitator motor from turning the agitator. At the same time the switch arm 71 is on contact 83 and a circuit is closed to the next stepping switch contact 83a through wire 83b and wire 83c. This energizes relay switch coil 44a of switch 44′ corresponding to switch 44 of FIG. 2, by actuating its pump motor switch operator 24 through line 24a and its valve operator 27a through wire 27b. The rotation of the drum also carries the impulse contact 73a to its fourth position where contact 84′ is in circuit with 73a.

The charging of the third ingredient continues, moving the switch arm 71 again toward the right until it strikes the impulse contact 84′, at which time it is also engaging switch contact 84. The impulse through contact 84′ rotates the drum another step, breaking the circuit to wire 83c, so as to stop the feeding of the third ingredient. A circuit then exists from switch contact 84 to stepping switch contact 84a through wire 84b to wire 84c which energizes the relay of a switch 45b of switch 45″ which is the counterpart of switch 45′ and connected through wire 32b in parallel with switch 45′ to again effect rotation of the steam coil and turn on the steam for the second cook-down. At this time the impulse contact 73a on the drum is in circuit with impulse contact 85′. Also at this time the second cook-down occurs and there is again a decreasing load in the cooking vessel causing switch arm 71 to move again toward the left along the contact 84 until it strikes the impulse contact 85′ to effect the next advance of the stepping switch, and at this advance then make circuit through contact 85 with stepping switch contact 85a through wire 85b to line 85c. This advance of the stepping switch again breaks the supply of steam to the agitator and stops the agitator. The energizing of line 85c energizes the switch coil of relay switch 47a and starts a multi-contact timer 48′ corresponding generally to 48 in FIG. 2 into operation. This allows first a short period in which a small batch of a fourth ingredient, such as seasoning or spices, to be dumped manually into the kettle. During this operation of the timer steam continues to flow through the agitator and the agitator continues to turn so as to thoroughly mix in the fourth ingredient and provides sufficient time for the batch in the kettle to be brought to a rolling boil, the timer at this position making contact through wire 32b with the devices 12a and 32. The timer will then advance to a second position where it will stop the agitator, close off the supply of steam, and transmit an impulse through wire 31b to actuate valve operator 31a of the dump valve. After sufficient time has elapsed for the tank to drain, the timer moves to a third position to close a circuit through wire 29b to rinse water valve operator 29a and hold the rinse valve open for a period of time. The timer then breaks this circuit moving to a fourth position where it sends an impulse through wire 85b to the electromagnetic pawl 73 to advance the stepping switch to starting "off" position. During the rinsing operation the timer will also keep the dump or drain valve open through a relay switch 86 in parallel with valve operator 29a this relay connecting 31a and 29a in parallel when it is energized, but the switch, being normally open, prevents the rinse valve from opening when the dump valve first opens.

By opening the switch 77 at any time the automatic operation may be terminated and manual operation may take place. This is effected through wire 75 leading from the power source to manual switches 80x, 81x, 82x, 83x, 84x, 85x, 85y, and 86x, through the closing of which the functions of the stepping switch contacts 80a to 86a respectively can be performed.

It will be readily understood by those skilled in the art that the circuiting herein disclosed is only illustrative and that functionally equivalent but much more sensitive instrumentation is available but which forms no part per se of this invention, and greater sensitivity may be secured by using potentiometers with amplifiers and voltage comparators in place of a switch and contact arrangement at 71 and 80 to 85 where succeeding operations involve matching potentiometer voltages with preset voltages in a well-known manner.

The invention herein provides a unique batch cooker in which various ingredients are charged by weight into a mixer which is also a cooker, so that no transfer of mixed ingredients from one vessel to another is required, and the subsequent cooking, at least in major areas, is established by keeping the cooking vessel on the weigh scales and procedures are determined by weight changes that are continuously recorded and interpolated into action. Any operator of reasonable intelligence can follow a weight schedule without being a skilled cook or chef, and cooking may be wholly or completely automated.

While we have shown and specifically described one embodiment of our invention, it will be understood that various changes and modifications may be made therein within the contemplation of our invention and under the scope of the following claims.

We claim:

1. Apparatus for batch cooking comprising a kettle; feed means for supplying ingredients selectively into the vessel; means associated with the vessel for heating the contents thereof to cook the same; weighing means; the vessel being supported by the weighing means such that the change in weight by the addition of ingredients to or from the vessel and loss by evaporation during cooking is measured constantly, and means responsive to the weighing means connected to the feed means for adding predetermined quantities of ingredients to the vessel.

2. Apparatus for batch cooking comprising a kettle, feed means for supplying ingredients selectively into the vessel, means associated with the vessel for heating the contents thereof to cook the same, weighing means, the vessel being supported by the weighing means such that the change in weight by the addition of ingredients to or from the vessel and loss of weight by evaporation during cooking is measured constantly, means responsive to the weighing means connected to the feed means for adding predetermined quantities of ingredients to the vessel, means for discharging cooked ingredients from the vessel, and means responsive to the measuring means for operating said last-named means.

3. Apparatus for batch cooking comprising a kettle, feed means for supplying ingredients selectively into the vessel, means associated with the vessel for heating the contents thereof to cook the same, weighing means, the vessel being supported by the weighing means such that the change in weight by the addition of ingredients to or from the vessel and loss of weight by evaporation during cooking is measured constantly, means responsive to the weighing means connected to the feed means for adding predetermined quantities of ingredients to the vessel, means for discharging cooked ingredients from the vessel, means responsive to the measuring means for operating said last-named means, and means for rinsing the vessel when the discharge of ingredients therefrom is completed.

4. Apparatus for batch cooking comprising a kettle, weighing means for supporting the kettle, feed means controlled by the kettle, means for metering predetermined quantities of ingredients to the kettle in a predetermined sequence, heating means supported by the kettle which may be turned on and off, and means responsive to the weighing means for turning the heat on and off.

5. Apparatus for batch cooking as defined in claim 4 wherein the kettle has a discharge valve, and means under the control of the weighing means for controlling the opening of the discharge valve.

6. A cooking apparatus comprising a kettle, a weighing scale on which the kettle is permanently mounted, electrically controlled means for supplying a plurality of ingredients to the kettle, sequencing means connected to the measuring means controlled by operation of the scale for supplying predetermined amounts of ingredients to the kettle at different periods during the cooking of the ingredients within the vessel, means for heating the contents of the kettle for cooking the same, said last-mentioned means being rotatable for mixing as well as heating the ingredients within the kettle and evaporating volatiles therefrom, the heating means being controlled by the sequencing means for supplying heat to the contents until the cooking has effected a predetermined decrease in the weight of said contents.

7. A cooking apparatus as defined in claim 6 wherein there is means for discharging ingredients from the vessel controlled by the sequencing means for emptying the cooked product from the vessel only after a predetermined decrease of weight.

8. A system for batch cooking a food product which comprises a cooking vessel, a scale on which the vessel is mounted and responsive to the weight of material in the vessel, means for heating the contents of the vessel, means opening said first valve for feeding a first ingredient into the vessel, a second valve for controlling the flow of a second ingredient into the cooking vessel, means for supplying heat to the contents of the vessel while it is on the scale to effect cooking and evaporation of a volatile ingredient, means for discharging cooked product from the vessel, and means responsive to the operation of the scale for closing the first valve after a predetermined weight of the first ingredient has been charged into the vessel and for opening the second valve at that time to feed the second ingredient to the vessel and for closing the second valve after a predetermined weight of the combined first and second ingredients is reached and thereafter for initiating and terminating the supply of heat to the contents until loss of weight by evaporation has reached a predetermined point and finally effecting actuation of the discharge means to remove the product from the vessel.

References Cited

UNITED STATES PATENTS

| 892,298 | 6/1908 | Palmer | 177—245 |
| 2,040,729 | 5/1936 | Cissey | 177—245 |
| 2,416,994 | 3/1947 | Harper | 222—58 |
| 3,259,056 | 7/1966 | King | 99—325 |

A. LOUIS MONACELL, *Primary Examiner.*

M. VOET, *Assistant Examiner.*